United States Patent
Fournier et al.

(10) Patent No.: US 10,112,842 B2
(45) Date of Patent: Oct. 30, 2018

(54) PROCESS TO PRODUCE MAGNESIUM COMPOUNDS, AND VARIOUS BY-PRODUCTS USING SULFURIC ACID IN A HCL RECOVERY LOOP

(71) Applicant: ALLIANCE MAGNÉSIUM, Brossard (CA)

(72) Inventors: Joël Fournier, Carignan (CA); Laury Gauthier, St-Apollinaire (CA)

(73) Assignee: ALLIANCE MAGNÉSIUM, Brossard, QC (CA)

( * ) Notice: Subject to any disclaimer, the term of this patent is extended or adjusted under 35 U.S.C. 154(b) by 0 days.

(21) Appl. No.: 15/527,050

(22) PCT Filed: Nov. 18, 2015

(86) PCT No.: PCT/CA2015/051202
§ 371 (c)(1),
(2) Date: May 16, 2017

(87) PCT Pub. No.: WO2016/077925
PCT Pub. Date: May 26, 2016

(65) Prior Publication Data
US 2017/0355609 A1   Dec. 14, 2017

Related U.S. Application Data

(60) Provisional application No. 62/081,151, filed on Nov. 18, 2014.

(51) Int. Cl.
*C01F 5/00* (2006.01)
*C01F 5/12* (2006.01)
(Continued)

(52) U.S. Cl.
CPC .............. *C01F 5/12* (2013.01); *C01G 53/003* (2013.01); *C22B 3/10* (2013.01); *C22B 3/22* (2013.01); *C22B 3/44* (2013.01); *C22B 26/22* (2013.01)

(58) Field of Classification Search
CPC ... C01F 5/12; C01F 5/40; C22B 26/22; C22B 3/10; C22B 3/22; C22B 3/44; C01B 7/01; C01B 7/0706
(Continued)

(56) References Cited

U.S. PATENT DOCUMENTS 2,144,339 A * 1/1939 Laist .................. C25C 3/04
                                                205/404
2,155,119 A * 4/1939 Ebner .................... B01J 8/1836
                                                423/594.16
(Continued)

FOREIGN PATENT DOCUMENTS

CN      1050411      4/1991
CN      101090983   12/2007
(Continued)

*Primary Examiner* — Steven J Bos
(74) *Attorney, Agent, or Firm* — Norton Rose Fulbright Canada LLP

(57) ABSTRACT

The present description relates to a process for extracting magnesium compounds from magnesium-bearing ores comprising leaching serpentine tailing with dilute HCl to dissolve the magnesium and other elements like iron and nickel. The residual silica is removed and the rich solution is further neutralized to eliminate impurities and recover nickel. Magnesium chloride is transformed in magnesium sulfate and hydrochloric acid by reaction with sulfuric acid. The magnesium sulfate can be further decomposed in magnesium oxyde and sulphur dioxide by calcination. The sulphur gas can further be converted into sulfuric acid.

19 Claims, 2 Drawing Sheets

(51) Int. Cl.
*C22B 3/10* (2006.01)
*C22B 3/22* (2006.01)
*C22B 26/22* (2006.01)
*C01G 53/00* (2006.01)
*C22B 3/44* (2006.01)

(58) Field of Classification Search
USPC ........ 423/158–161, 163, 166, 140–142, 488; 205/404
See application file for complete search history.

(56) References Cited

U.S. PATENT DOCUMENTS

| | | | | |
|---|---|---|---|---|
| 2,398,493 | A * | 4/1946 | Butt | C01F 5/30 205/404 |
| 2,398,743 | A * | 4/1946 | Heath | C01F 5/30 423/160 |
| 3,980,753 | A * | 9/1976 | Grill | C01F 5/02 423/161 |
| 5,650,057 | A | 7/1997 | Jones et al. | |
| 2006/0002835 | A1* | 1/2006 | Neudorf | C22B 23/043 423/140 |
| 2015/0218720 | A1* | 8/2015 | Picard | C25C 1/08 205/405 |

FOREIGN PATENT DOCUMENTS

| | | |
|---|---|---|
| WO | 2006043158 | 4/2006 |
| WO | 2014029031 | 2/2014 |

* cited by examiner

PROCESS TO PRODUCE MAGNESIUM COMPOUNDS, AND VARIOUS BY-PRODUCTS USING SULFURIC ACID IN A HCL RECOVERY LOOP

CROSS-REFERENCE TO RELATED APPLICATIONS

This application claims priority from U.S. provisional application Ser. No. 62/081,151 filed on Nov. 18, 2014. The content of the priority application is herewith incorporated in its entirety.

TECHNICAL FIELD

The present disclosure relates to the extraction of magnesium metal from magnesium-bearing ores using sulfuric acid in a HCl recovery loop producing $MgSO_4$ and MgO.

BACKGROUND ART

Exploitation of important deposits of serpentine for the asbestos fiber production in the last decades has generated huge quantities of tailings in North America. This material consists mainly of lizardite $Mg_3Si_2O_5(OH)_4$ with minor antigorite $(Mg, Fe)_3Si_2O_5(OH)_4$, brucite $Mg(OH)_2$, magnetite $Fe_3O_4$ and awarite $Ni_5Fe_3$. Asbestos tailings are an excellent source of magnesium and silica with appreciable amount of nickel (around 0.2%).

By hydrometallurgical treatments, serpentine tailing can be transform in various products, for examples $MgCl_2$, $MgSO_4$, MgO and amorphous silica, which confirm the potential of this resource. As its name suggest, hydrometallurgical processes are closely linked to the use of water. Acidified aqua media allows to solubilize elements but their subsequent evaporation must be limited. Water elimination can require a large amount of energy and consequently makes industrial operation less profitable.

The use of hydrochloric acid as a leach medium to extract magnesium in serpentine is known and has been demonstrated to be effective. In U.S. Pat. No. 2,398,493, serpentine is treated with HCl 20% at ambient pressure to produce magnesium chloride. The brine is purified by addition of calcined serpentine and magnesium oxide to raise the pH until 7.6. The slurry is filtered and the rich magnesium brine is evaporated to obtain a magnesium chloride salt. By conventional electrolysis of magnesium chloride, hydrochloric acid is regenerated by direct synthesis between chlorine gas and an external source of hydrogen.

Although known processes allow to extract magnesium and nickel with dilute hydrochloric acid, only magnesium is recovered. Nickel is considered as an impurities and is eliminated together with iron and magnesium silicate. Also, heating the large amount of ore at elevated temperatures combined with evaporation of water to recuperate magnesium salt involve a high energy cost.

Due to the fluctuations in metals prices and the pressure of market competition, the mining industry is looking to diversify its product offer and to reduce its production cost. A flexible production combined with an economic process are the key to remain financially viable.

Accordingly, there is thus still a need to be provided with an improved process for extracting magnesium from magnesium-bearing ores such as asbestos tailings.

SUMMARY

In accordance with the present description there is now provided a process extracting magnesium metal from magnesium-bearing ores, comprising the steps of (a) leaching the magnesium-bearing ores with HCl obtaining a slurry containing chloride compounds; (b) filtering the slurry to obtain a liquor containing the chloride compounds and silica, the silica being extracted from the liquor; (c) purifying the liquor by increasing the pH by adding a neutralizing agent producing a brine chloride solution enriched in magnesium containing precipitated iron and impurities; (d) filtering the brine to extract the precipitated iron and impurities contained in the brine; (e) neutralizing the brine to extract the precipitated nickel content by adding a base; and (f) adding the magnesium chloride brine into sulfuric acid forming magnesium sulfate and hydrochloric acid which is recycled.

In an embodiment, the process described herein further comprises the step (g) of thermally decomposing the magnesium sulfate in sulphur dioxide gas and magnesium oxide.

In another embodiment, the magnesium-bearing ores are magnesium silicate ores or tailings.

In a further embodiment, the magnesium silicate ores are serpentine mineral, lizardite, antigorite, olivine, talc, sepiolite or a mixture thereof.

In a particular embodiment, the magnesium-bearing ores are leached with 4-9M HCl at 70-120° C.

In another embodiment, the silica is extracted by a solid/liquid separation.

In an additional embodiment, the silica is extracted by using a filtered press or a band filter.

In a further embodiment, the neutralizing agent is serpentine tailing.

In another embodiment, the process described herein further comprises adding an oxidizing agent to convert the iron in solution in a bivalent form to a trivalent form.

In another embodiment, the oxidizing agent is chlorine gas, hydrogen peroxide, potassium permanganate, $O_2$, air, or a mixture thereof.

In another embodiment, the neutralization step (e) is conducted at a temperature between 60-110° C.

In another embodiment, the base is magnesium oxide, sodium hydroxide, potassium hydroxide or a mixture thereof.

In another embodiment, the base is added until the pH of the brine is 2-4.

In an embodiment, the nickel is recovered by precipitation or alternatively on an exchange resin.

In another embodiment, the process encompassed herein further comprises the step (e') of precipitating the contained manganese from the neutralized brine.

In a particular embodiment, the process encompassed herein further comprises adding an oxidative agent to convert the manganese in solution from a bivalent form to a quadrivalent form.

In another embodiment, the oxidative agent is chlorine gas, hydrogen peroxide, potassium permanganate $O_2$, air or a mixture thereof.

In another embodiment, the oxidative agent is added until the oxidation/reduction potential reach 650 mV.

In another embodiment, the neutralized brine is maintained at around 80° C.

In another embodiment, the process encompassed herein further comprises the step (e") of precipitating by crystallization the magnesium chloride contained in the enriched magnesium chloride brine using dry gaseous hydrogen chloride obtaining a crystal of magnesium chloride and a solution of magnesium chloride and filtering to separate the crystal of magnesium chloride from the solution of magnesium chloride, the filtrated magnesium chloride crystal being added to sulfuric acid to form magnesium sulfate and hydrochloric acid.

In a further embodiment, the dry gaseous hydrogen chloride is sparged or bubbled through the enriched magnesium chloride brine.

In an additional embodiment, the dry gaseous hydrogen chloride is sparged or bubbled up to a concentration of 32-37%.

In another embodiment, magnesium chloride crystal is added to sulfuric acid.

In another embodiment, hydrochloric acid mixed with the magnesium sulfate is stripped of by the use of a gas producing gaseous and wet hydrochloric acid, the gaseous hydrochloric acid being recycled.

In an additional embodiment, the gas is air or nitrogen.

In another embodiment, the wet hydrochloric acid and the filtrated magnesium chloride solution are further dehydrated in a dehydration unit in contact with a concentrated hydrochloric acid solution producing dry gaseous hydrochloric acid which is recycled and a diluted hydrochloric solution which is reused in the leaching step (a).

In an embodiment, the process described herein further comprises the step (f) of converting the magnesium chloride contained in the enriched magnesium chloride brine into magnesium metal by electrolysis.

It is also provided a process for extracting magnesium sulfate from magnesium-bearing ores, comprising the steps of: (a) leaching the magnesium-bearing ores with HCl obtaining a slurry containing chloride compounds; (b) filtering the slurry to obtain a liquor containing the chloride compounds and silica, the silica being extracted from the liquor; (c) purifying the liquor by increasing the pH by adding a neutralizing agent producing a brine chloride solution enriched in magnesium containing precipitated iron and impurities; (d) filtering the brine to extract the precipitated iron and impurities contained in the brine; (e) neutralizing the brine to extract the precipitated nickel content by adding a base; (e'') precipitating by crystallization the magnesium chloride contained in the magnesium chloride brine using dry gaseous hydrogen chloride obtaining a crystal of magnesium chloride and a solution of magnesium chloride; (e''') filtering to separate the crystal of magnesium chloride from the solution of magnesium chloride; and (e'''') adding the magnesium chloride crystal to sulfuric acid to form magnesium sulfate and hydrochloric acid which is recycled.

BRIEF DESCRIPTION OF THE DRAWINGS

Reference will now be made to the accompanying drawings, showing by way of illustration, a preferred embodiment thereof, and in which.

DETAILED DESCRIPTION

It is provided a process for extracting magnesium metal from magnesium-bearing ores.

The process described herein provides more specifically a method for the production of various magnesium products, amorphous silica and nickel hydroxide from a magnesium silicate ore, including regeneration of hydrochloric acid using sulfuric acid.

The method generally comprises leaching serpentine tailing with dilute HCl to dissolve the magnesium and other elements like iron and nickel. The residual silica is removed and the rich solution is further neutralized to eliminate impurities and recover nickel. Magnesium chloride is transformed in magnesium sulfate and hydrochloric acid by reaction with sulfuric acid. The magnesium sulfate can be further decomposed in magnesium oxide and sulphur dioxide by calcination. The sulphur gas can further be converted into sulfuric acid. Thus, contrary to the process described in International application no. PCT/CA2015/050670, the content of which is incorporated herewith in its entirety, production of $MgSO_4$ is favored and $MgSO_4$ is then calcinated to recover MgO. The magnesium chloride in solution can be crystallized, then dehydrated and subsequent electrolysis of anhydrous magnesium chloride produces pure magnesium metal and hydrochloric acid.

The process of the present disclosure can be effective for treating various magnesium silicate ores such as for example, and not limited to, group of serpentine mineral, lizardite, antigorite, olivine, talc, sepiolite or mixtures thereof which can be used as starting material.

Mineral processing allows to separate the valuable fraction from the uneconomic fraction (gangue) of an ore. After recovery of the desired mineral, tailings are left over. Tailings, also called mine dumps, culm dumps, slimes, tails, refuse, or leach residue, are the materials left over which can be treated by the process described herein.

The process describe herein allows processing and extracting magnesium from tailing, such as asbestos mine tailing, obtained after processing of magnesium-bearing ores.

Hydrochloric acid is an expensive product and for this reason, in mineral extractive processes it has to be recover. One way of producing HCl is by reacting sulfuric acid with a chloride salt. In the denominated "Leblanc Process" from the 18$^{th}$ century, sodium chloride was used to form sodium sulfate which was afterward transformed in sodium carbonate by reaction with calcium carbonate and carbon.

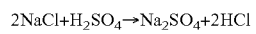
$2NaCl+H_2SO_4 \rightarrow Na_2SO_4+2HCl$

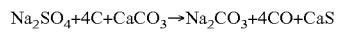
$Na_2SO_4+4C+CaCO_3 \rightarrow Na_2CO_3+4CO+CaS$

In order to regenerate hydrochloric acid, the use of sulfuric acid as described hereinabove allows the production of magnesium sulfate during serpentine transformation.

Figure 1:
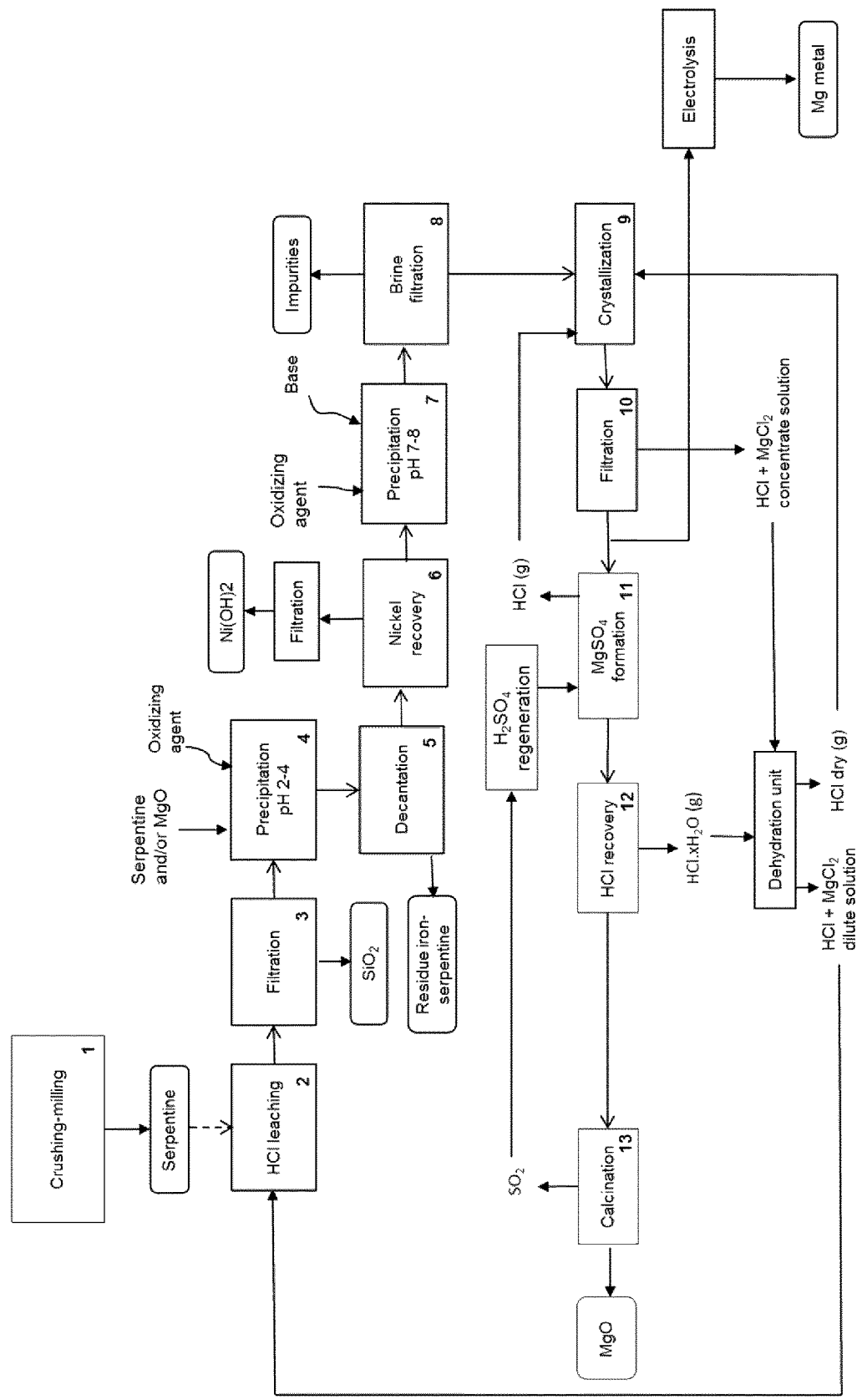
FIG. 1 illustrates a bloc diagram of a process according to one embodiment for extracting magnesium metal.

As can be seen from FIG. 1, and according to one embodiment, the process comprises a first step of grinding the starting material. The process described herein takes advantage of the low $MgSO_4$ solubility at first in a sulfuric acid background and thereafter with an increased background of hydrochloric acid. FIG. 1 is characterized by the crystallization of magnesium chloride in a concentrate HCl media, which is afterwards transformed in sulfate salt.

Classification (Step 1), Leaching (Step 2) and Filtration (Step 3)

Tailing, and particularly asbestos tailing, can be crushed (grinding/milling, step 1). To perform the leach step, serpentine tailing is crushed and milled until the particles pass through a screen of 400 microns. A fine fraction is separated to further be used as a neutralising agent to precipitate impurities. In an embodiment, the ore can be further subjected to a magnetic separation to concentrate the contained nickel, which is mainly recovered in the magnetic fraction.

The crushed classified tailing then undergoes acid leaching (step 2). The leach of serpentine by an hydrochloric acid solution allows dissolving magnesium and other elements like iron, nickel and manganese in chloride compounds. A significant portion of the silica is inert to HCl digestion and remain solid in the reaction mixture due to its inability to solubilize in this aqueous environment.

The leaching is conducted for example in 4-9M HCl at a temperature around 70-120° C. for a period between one to 4 hours under a strong agitation to promote the kinetic dissolution. The amount of acid used is fixed at 1 time the stoichiometric requirement. At the end of the HCl digestion process, the pH of the slurry is less than one.

The slurry is afterward filtered (step 3) to recover silica ($SiO_2$) on an amorphous form characterised by a very large surface area. A solid/liquid separation of the slurry by suitable filtration equipment known in the art is used, such as a filter press or band filter to recuperate silica ($SiO_2$). This silica has a good purity given the high extraction efficiency of soluble elements in hydrochloric acid solution. Amorphous silica is a marketable product in various sectors and has an economical importance. Amorphous silica recovered can be used for example in cosmetics and paint.

Purification (Step 4) and Decantation (Separation, Step 5)

The rich solution from step 3 then undergoes a purification step (step 4) to remove by precipitation undesirable elements accessible at the targeted pH value. The addition of a neutralizing agent allows to increase the pH and precipitate impurities in hydroxide or oxide form.

Iron in solution is in two oxidation states. It is known that bivalent iron precipitates at higher pH than trivalent iron and in the same range as nickel. To prevent the jointed precipitation, an oxidizing agent is added to convert $Fe^{2+}$ into $Fe^{3+}$. Chlorine gas, hydrogen peroxide, potassium permanganate, $O_2$, air, or a mixture thereof are examples of such oxidizing agent.

The use of crude serpentine tailing as a neutralizing agent at this stage constitute an economic advantage by reducing the use of further chemical addition and/or transport. The ore is available on the site of extraction and transformation and the magnesium oxide is manufactured in situ as proposed herein. Serpentine is a basic magnesium silicate material and contains variable amount of brucite giving its acid-neutralizing capacity. The elimination of a serpentine calcination step, which is normally used in processes known and used in the industry, allows substantial energy saving. Also, the use of a magnesium base content as proposed herein allows enriching the resulting brine in desired elements. The MgO content neutralizes the acidity of brine and metals precipitate in hydroxide form. The acidity is determined by the amount of free hydrochloric acid and by the amount of oxidic contaminants.

Accordingly, the neutralization is conducted at a temperature between 60 to 110° C. to favor the dissolution of serpentine or mixture with magnesium oxide. The magnesium concentration in the brine thus increases and the iron content dissolves at first and precipitate afterwards. Oxidizing agent is introduced to convert the new bivalent iron in solution. The base is added until the pH is 2-4. Iron and other impurities precipitate together with the undissolved portion of serpentine which are separated by known methods, such as for example decantation (step 5).

Nickel Recovery (Step 6)

The nickel content in the enriched brine chloride solution obtained from step 5 is recovered by precipitation together with other elements accessible at the targeted pH value, such as around 4-7 (step 6). The neutralisation is conducted at 80° C. and the base used can be magnesium oxide, sodium hydroxide, potassium hydroxide or a mixture thereof. The precipitate, rich in nickel, is separated from the magnesium solution by filtration and can be purified further to increase their level of purity. The nickel hydroxide —$Ni(OH)_2$— with impurities is first dissolved in dilute hydrochloric acid and then passed on an exchange resin which catch specifically the nickel. For example, in U.S. Pat. No. 5,571,308, the use of a selective resin to remove the nickel in an acidic chloride media is described. The absorbed element is furthermore recovered from the ion exchange resin by contacting it with a mineral acid in order to elute the nickel. Nickel oxide (NiO) or nickel (Ni) can be obtained by pyro-hydrolysis or electrowining of the nickel solution.

Purification at Neutral pH (Step 7) and Brine Filtration (Step 8)

The residual impurities in solution from step 6, mainly manganese, are removed by precipitation (step 7). The oxidation/reduction potential (ORP potential) is increased and the pH is maintained at neutral value. By adding an oxidative agent, the bivalent manganese is converted into quadrivalent manganese and is therefore precipitated at lower pH.

For purification, the temperature of the solution is maintained at around 80° C. and the oxidative product is added until the ORP reach 650 mV. As a basic agent, magnesium oxide, sodium hydroxide, potassium hydroxide or a mixture thereof in dilute concentration can be used.

The undesirable metals are eliminated from solution by a solid/liquid separation (step 8), such as for example a filtration, to obtain a relatively pure or enriched magnesium chloride brine.

$MgCl_2 \cdot 6 H_2O$ crystallization (step 9) and filtration (step 10)

Dry hydrogen chloride is then used in a crystallization step to precipitate the magnesium chloride contained in the solution, thus concentrating the magnesium chloride. Crystallization is conducted in a crystallizer known in the art and the HCl is sparged or bubbled through the liquid (procedure also known as gas flushing).

Accordingly, in concentrated hydrochloric acid solution, the solubility of magnesium chloride is low due to common ion effect. Thus, when gaseous HCl is sparged (step 9) in the rich magnesium chloride brine, the magnesium salt is crystallized by the conversion of the aqueous environment in acid media. A better yield of crystallization is obtained if this step is performed at cold temperature due to the higher solubility of gas and inversely the lower solubility of salt. A dry gas injection also helps to recover magnesium chloride by avoiding additional water introduction. This technique allows saving energy compared to commonly used evaporation of water processes.

Dry HCl gas from subsequent step 11 and a dehydration unit are used on the brine at around 9% magnesium content until the HCl concentration reach 32-37%. The presence of small amounts of other salts in the media, such Ca, K and Na, does not affect significantly the solubility. The resulting slurry is filtrated (step 10) to separate magnesium chloride hexahydrate from hydrochloric acid solution with small amount of non-crystallized salt. The concentrated acid solution is further used to dehydrate wet HCl gas from step 12. A portion of magnesium chloride can be converted to a magnesium metal by an electrolysis process as described in International application no. PCT/CA2014050102.

$MgSO_4$ Formation (Step 11) and HCl Recovery (Step 12)

To restore the acid strength of the magnesium chloride and recovered the metal value as a sulfate, concentrated sulfuric acid is used. The simplified reaction is presented follows:

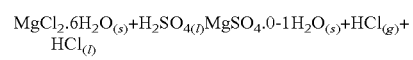

According to the amount of water in the reaction from magnesium salt, hydrogen chloride is formed in two states. It is known in the art that the maximum concentration of HCl in solution is around 37% due to its respective solubility in this media. As well, the magnesium sulfate produced has a very low hydration state that involved a reduction of the energy for further decomposition in magnesia (MgO).

For a maximum yield of conversion, magnesium chloride is added to hot and concentrate sulfuric acid, such as around 98% and at 80-130° C. (step 11) The reagents are mixed in a stoichiometric ratio or with an excess of acid. The HCl gas released is reintroduced in step 9 for the next magnesium chloride recovery.

Due to the low quantity of water in the system, a little volume of hydrochloric acid solution is obtained, which wets the solid. In the aim of returning all the acid on gaseous form in the previous crystallization step, the acid mixed with the magnesium sulfate is stripped off by the use of a gas, for examples air or nitrogen (step 12). The high vapor pressure of HCl gas allows to use this recovery technique. The wet HCl gas is further directed into a dehydration unit where it is drying by contact with the concentrated hydrochloric acid solution from step 9. Hydrochloric solution at 34-37% with amount of magnesium chloride serves as a dehydrating agent. In an almost saturated solution, the solubility of HCl gas is weak. The gas tends to volatilize and the solution enriches in water. Also, the presence of chloride salt in the acid solution reduces the solubility of HCl gas and increases their volatility. The residual diluted hydrochloric solution with low magnesium content is returned to the leaching step 2.

Figure 2:
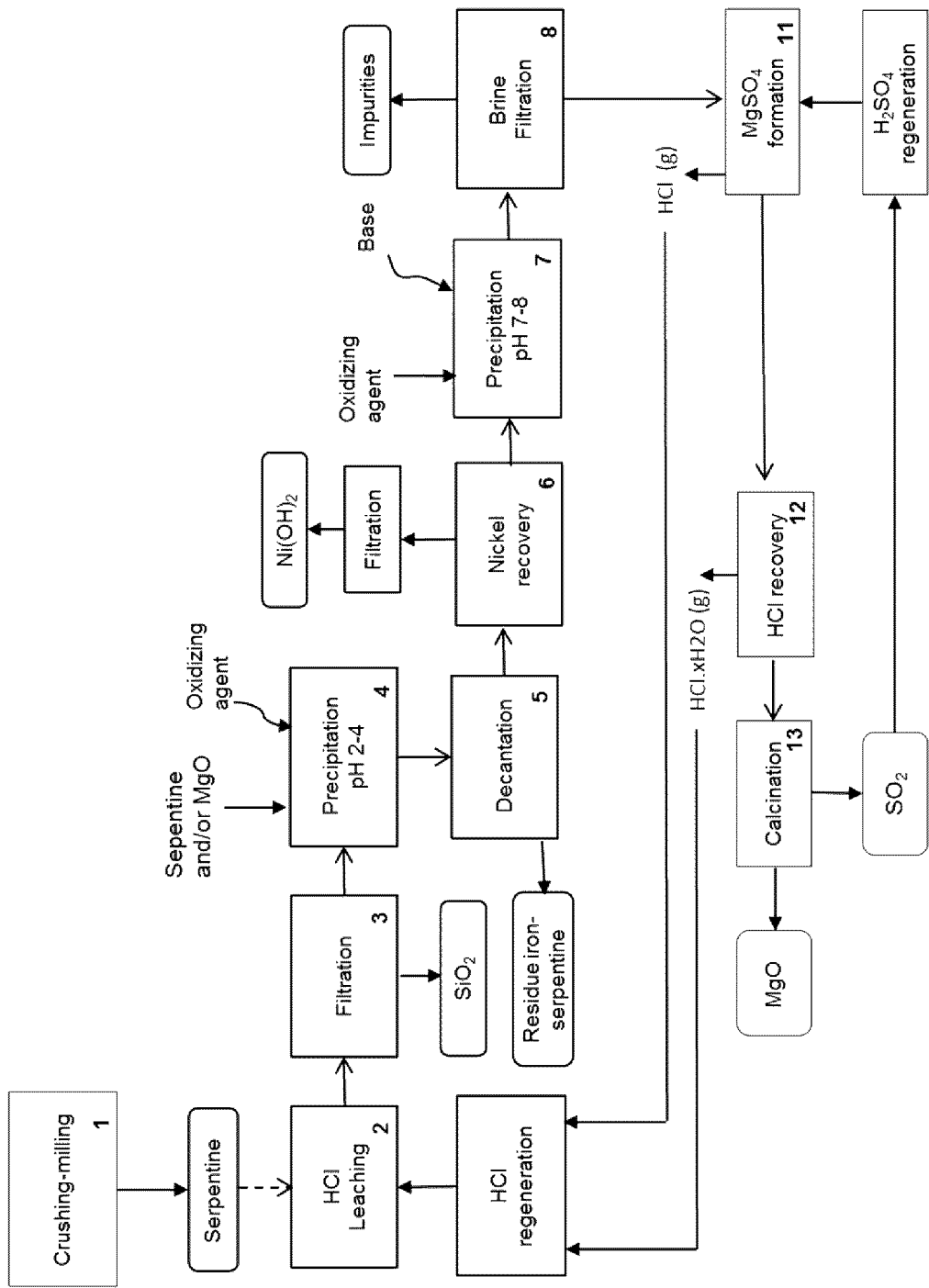
FIG. 2 illustrates a bloc diagram of a process according to another embodiment encompassed herein for extracting magnesium metal.

Alternatively, the magnesium chloride brine can be added directly into sulfuric acid to restore the acid strength of the magnesium chloride brine (see FIG. 2). The reaction is carried out under the same conditions as described previously. This alternative allows to limit the dilution effect of the acid by contact with water making it less reactive. For an interesting yield of reaction and magnesium sulfate precipitation, the chloride brine have to be saturated or supersaturated. Also, the brine temperature has to be at 80° C. or more. In this case, only hydrochloric acid in liquid form is generated and a magnesium sulfate with one or less water hydration is obtained. Depending on the initial brine concentration, a variable amount of magnesium sulfate stays dispersed in the HCl solution. To recover it, the acidic solution can be evaporated, which has a boiling point of 108° C. Thus, hydrochloric acid vapor gas at azeotropic composition is released, such at around 20%. The acid vapor is recycling to the leaching step 2.

As the above method, the hydrochloric acid trapped in magnesium sulfate is stripped off using air or nitrogen, generating a salt with a low total chloride content, such as less than 0.01% (step 12).

Calcination (Step 13)

The magnesium sulfate may be sold directly or thermally decomposed in sulphur dioxide gas ($SO_2$) and magnesium oxide (MgO), also called magnesia. Also, a portion of magnesia obtained could be used as a neutralizing agent to meet the internal need of serpentine transformation process. The further conversion of dioxide gas into sulfuric acid allows to recycle back the sulfate content necessary to the hydrochloric acid regeneration. Manufacturing processes of sulfuric acid are known in the art, such as described in King et al. (Sulfuric acid Manufacture, Second Edition: analysis, control and optimization, 2013, Elsevier Science Press, Oxford, England).

Accordingly, it is described a process to produce several commercials products from serpentine tailing. The tailing could be converted to MgO, $MgSO_4$, $MgCl_2$, Mg metal, amorphous silica or $Ni(OH)_2$. The process present advantage of products throughput modulation and low evaporative costs.

The present disclosure will be more readily understood by referring to the following examples which are given to illustrate embodiments rather than to limit its scope.

Example I $MgCl_2$ Brine Production 300 g of serpentine tailing passing through 400 μm was leached with 23% hydrochloric acid on stoichiometric requirement for 2 hours. The material contained 0.11% MnO, 0.27% NiO, 0.27% $K_2O$, 0.15% $Na_2O$, 1.40% CaO, 1.73% $Al_2O_3$, 8.32% $Fe_2O_3$, 36.6% MgO and 38.3% $SiO_2$ and 13.3% loss on ignition. The temperature was maintained at around 90° C. throughout the digestion process. 176 g of undissolved residue, such silica, was separated from the slurry and 1042 ml of acid solution was obtained. Solid was washed with a small amount of water and conserved for a next add digestion to avoid water addition. The extraction yield of magnesium, iron and nickel was 97%, 98% and 100% respectively. The solution mainly rich in magnesium and iron was oxidized then neutralized in three successive stages with the use of serpentine, magnesium oxide and sodium hydroxide. Table 1 show the chemical composition of the solution at each stages. At the end of the neutralization process, the brine contained only alkali metals.

TABLE 1

| | Composition at different pH | | | |
|---|---|---|---|---|
| | Leach solution | Neutralisation | | |
| Elements | pH 0.3 (g) | pH 2.3 (g) | pH 7.0 (g) | pH 6.8 (g) |
| Al | 1.26 | 0 | — | — |
| Co | 0.002 | 0.01 | — | — |
| Fe | 15.24 | 0.21 | 0 | — |
| Mn | 0.17 | 0.17 | 0.15 | 0.04 |
| Ni | 0.57 | 0.45 | 0.01 | 0 |
| Ca | 0.42 | 0.42 | 0.42 | 0.42 |
| K | 0.28 | 0.28 | 0.28 | 0.28 |
| Mg | 56.93 | 60.28 | 60.28 | 60.28 |
| Na | 0.03 | 0.03 | 1.11 | 1.45 |

Example II

Solubility of $MgCl_2.6H_2O$ in Concentrated HCl Solution 167 g of $MgCl_2.6H_2O$ was dissolved in 37% HCl at 35° C. for 15 minutes, such in comparable solubility conditions in water. The slurry was further cooled at 15° C. and filtrated to remove the salt from acid solution. 13% of magnesium chloride was dissolved.

Example III $MgSO_4$ Production

Magnesium chloride on liquid and solid form were reacted with 1.1 stoichiometric requirement with 96%

$H_2SO_4$. The acid was heated at 125° C. The temperature was maintained at around 100° C. throughout the $MgCl_2$ transformation process. These tests were performed under the following conditions.

TABLE 2

Experimental conditions

| No | $MgCl_2$ (g) | $MgSO_4$ (g) | Water (g) | Comments |
|---|---|---|---|---|
| 1 | 75.5 | 16.1 | 184.0 | Saturated $MgCl_2$ brine |
| 2 | 75.5 | 14.8 | 137.7 | Supersaturation $MgCl_2$ brine |
| 3 | 75.5 | 16.0 | 88.4 | $MgCl_2 \cdot 6H_2O$ |

For the first and second tests, the brine added were previously at 80° C. At the end of the reaction, the solid-liquid mixture were separated by filtration. The amount of magnesium in the acid solutions were determined. In test 3, a small volume of liquid was generated, which wetted the $MgSO_4$ formed.

Table 3 below presents the volume of hydrochloric acid solution produced and the percent of magnesium recovered according to the original concentration.

TABLE 3

Volume of HCl solution and magnesium content

| No | Volume HCl solution ml | Mg in solution % |
|---|---|---|
| 1 | 130 | 44.4 |
| 2 | 94 | 28.5 |
| 3 | — | — |

Solids from tests 1 and 2 were dried at 80° C. overnight then analyzed to know their composition. The amount of Mg and sulfate were very close to the $MgSO_4 \cdot H_2O$ formula.

TABLE 4

Magnesium and sulfate contained in $MgSO_4 \cdot H_2O$

|  | Mg | $SO_4$ |
|---|---|---|
| Theoretical | 17.6% | 69.4% |
| Obtained |  |  |
| Test 1 | 15.8% | 68.0% |
| Test 2 | 16.5% | 66.9% |

The solid from test 3 was put in the oven for one hour at 200° C. to release the HCl trapped. Only 0.01% of chlorine was measured in the magnesium sulfate, making it possible to conclude that the yield of magnesium chloride transformation was near to 100%. Also, the result confirm the ease of HCl recovery.

While the invention has been described in connection with specific embodiments thereof, it will be understood that it is capable of further modifications and this application is intended to cover any variations, uses, or adaptations of the invention, including such departures from the present disclosure as come within known or customary practice within the art to which the invention pertains and as may be applied to the essential features hereinbefore set forth, and as follows in the scope of the appended claims.

What is claimed is:

1. A process for extracting magnesium sulfate from magnesium-bearing ores, comprising the steps of:
   (a) leaching the magnesium-bearing ores with HCl to obtain a slurry containing chloride compounds;
   (b) filtering the slurry to obtain a liquor containing the chloride compounds and silica;
   (c) purifying the liquor by increasing the pH by adding a neutralizing agent to produce a brine chloride solution enriched in magnesium containing precipitated iron and impurities;
   (d) filtering the brine chloride solution to extract the precipitated iron and impurities;
   (e) neutralizing the brine chloride solution to extract nickel by adding a base, to produce an enriched magnesium chloride brine; and
   (f) adding the enriched magnesium chloride brine to sulfuric acid to form magnesium sulfate and hydrochloric acid.

2. The process of claim 1, further comprising step (g) of thermally decomposing the magnesium sulfate into sulphur dioxide gas and magnesium oxide.

3. The process of claim 1, wherein the magnesium-bearing ores are magnesium silicate ores or tailings.

4. The process of claim 3, wherein the magnesium silicate ores are serpentine mineral, lizardite, antigorite, olivine, talc, sepiolite or a mixture thereof.

5. The process of claim 1, wherein the neutralizing agent is serpentine tailing.

6. The process of claim 1, further comprising adding an oxidizing agent to convert the iron in solution in a bivalent form to a trivalent form.

7. The process of claim 6, wherein the oxidizing agent is chlorine gas, hydrogen peroxide, potassium permanganate, $O_2$, air, or a mixture thereof.

8. The process of claim 1, wherein the neutralization step (e) is conducted at a temperature between 60-110° C.

9. The process of claim 1, wherein the base is magnesium oxide, sodium hydroxide, potassium hydroxide or a mixture thereof.

10. The process of claim 1, further comprising step (e') of precipitating manganese from the neutralized brine.

11. The process of claim 10, further comprising adding an oxidative agent to convert the manganese from a bivalent form to a quadrivalent form.

12. The process of claim 11, wherein said oxidative agent is chlorine gas, hydrogen peroxide, potassium permanganate, $O_2$, air, or a mixture thereof.

13. The process of claim 1, further comprises step (e'') of precipitating by crystallization the magnesium chloride contained in the enriched magnesium chloride brine using dry gaseous hydrogen chloride to obtain a crystal of magnesium chloride and a solution of magnesium chloride and filtering to separate said crystal of magnesium chloride from said solution of magnesium chloride, the filtered magnesium chloride crystal being added to sulfuric acid to form magnesium sulfate and hydrochloric.

14. The process of claim 13, wherein the dry gaseous hydrogen chloride is sparged or bubbled through the enriched magnesium chloride brine.

15. The process of claim 13, wherein the wet hydrochloric acid and the filtrated magnesium chloride solution are further dehydrated in a dehydration unit in contact with a concentrated hydrochloric acid solution to produce dry gaseous hydrogen chloride which is recycled and a diluted hydrochloric acid solution which is reused in the leaching step (a).

16. The process of claim 13, further comprising step (f) of converting the magnesium chloride contained in the enriched magnesium chloride brine into magnesium metal by electrolysis.

17. A process for extracting magnesium sulfate from magnesium-bearing ores, comprising the steps of:
(a) leaching the magnesium-bearing ores with HCl to obtain a slurry containing chloride compounds;
(b) filtering the slurry to obtain a liquor containing the chloride compounds and silica;
(c) purifying the liquor by increasing the pH by adding a neutralizing agent to produce a brine chloride solution enriched in magnesium containing precipitated iron and impurities;
(d) filtering the brine chloride solution to extract the precipitated iron and impurities;
(e) neutralizing the brine chloride solution to extract nickel by adding a base to produce an enriched magnesium chloride brine;
(e″) precipitating by crystallization the magnesium chloride contained in the magnesium chloride brine using dry gaseous hydrogen chloride to obtain a crystal of magnesium chloride and a solution of magnesium chloride;
(e‴) filtering to separate said crystal of magnesium chloride from said solution of magnesium chloride; and
(e″″) adding the magnesium chloride crystal to sulfuric acid to form magnesium sulfate and hydrochloric acid.

18. The process of claim 17, further comprising step (e′) of precipitating the contained manganese from the neutralized brine chloride solution.

19. The process of claim 17, further comprising step (g) of thermally decomposing the magnesium sulfate into sulphur dioxide gas and magnesium oxide.

\* \* \* \* \*